United States Patent [19]

Schotten et al.

[11] 4,289,618
[45] Sep. 15, 1981

[54] MOTION CONTROL FOR A FILTER PRESS

[75] Inventors: Alfons Schotten, Düren; Herman J. Spölgen, Langerwehe; Ulrich Rilling, Düren, all of Fed. Rep. of Germany

[73] Assignee: Eberhard Hoesch & Söhne GmbH & Co., Düren, Fed. Rep. of Germany

[21] Appl. No.: 43,028

[22] Filed: May 29, 1979

[30] Foreign Application Priority Data

May 30, 1978 [DE] Fed. Rep. of Germany ....... 2823501

[51] Int. Cl.³ ............................................. B01D 25/12
[52] U.S. Cl. ................................... 210/142; 210/143; 210/225; 210/230
[58] Field of Search ............... 210/138, 141, 142, 143, 210/148, 225, 230

[56] References Cited

U.S. PATENT DOCUMENTS

| 924,131 | 6/1909 | Behrend | 210/141 X |
| 3,012,154 | 12/1961 | Simmons | 210/142 X |
| 4,159,249 | 6/1979 | Schotten | 210/230 |

FOREIGN PATENT DOCUMENTS

| 2818989 | 9/1978 | Fed. Rep. of Germany | 210/143 |
| 0000012 | 1/1979 | Fed. Rep. of Germany | 210/143 |

Primary Examiner—John Adee
Attorney, Agent, or Firm—Spencer & Kaye

[57] ABSTRACT

A plate filter press has a horizontal guide carrier extending in the length dimension of the plate filter press; a plurality of vertically oriented filter plates shiftably supported on the guide carrier; and a filter plate shifting apparatus for individually displacing the filter plates from a closed side towards an open side of the press. The filter plate shifting apparatus has a motor driving a traveling carrier element and filter plate engaging elements mounted on the traveling carrier element. There is further provided a displacement sensor for emitting signals in response to the motion of the filter plate engaging elements and a monitoring and control device connected to the displacement sensor for receiving its signals for determining the position of the successive traveling paths of the filter plate engaging elements with respect to the guide carrier to determine the required displacement characteristics for each filter plate. The monitoring and control device is connected to the motor for controlling the motion of the filter plate engaging elements for controlling the shifting motion of the individual filter plate as a function of the displacement characteristics.

10 Claims, 10 Drawing Figures

MOTION CONTROL FOR A FILTER PRESS

BACKGROUND OF THE INVENTION

This invention relates to a plate-type filter press which includes a plurality of vertically oriented filter plates each being horizontally shiftably supported on at least one guide carrier of the press frame. The filter press has a plate shifting apparatus which includes a traveling carrier element movable back and forth by means of a drive between a closed side of the filter press and an open side thereof. On the traveling carrier element there are mounted filter plate engaging elements adapted to engage a projection forming a fixed part of each filter plate for shifting the plates individually and in succession towards the open side of the filter press.

In plate-type filter presses of the above-outlined kind, where the filter plates are relatively large and thus the weight of the individual filter plates is significant, the shifting of the individual filter plates (for example, for ejecting the filter cake after completion of a filter process) can be effected only by means of a motor-power assisted plate shifting arrangement. If it is a desideratum to achieve short-period plate shifting steps, the shifting and return speeds of the plate shifting arrangement have to be high. Inherently, high shifting speeds lead to large accelerations and thus involve large accelerating forces affecting the individual filter plate that undergoes shifting. In addition to high-power moving mechanisms, such accelerating forces require stable and thus expensive suspensions and guides for the filter plates. Further, the operation of such filter presses involves substantial noise as the shifted filter plate collides with the outermost plate of the filter plate stack to which the plate has been moved. Further, such collisions lead to a significant wear of the filter cloth.

Further, the use of such filter press in special environments, particularly in the filtration of waste water sludge, involves the problem that after a while, the filter cloths become clogged, resulting in a significant deterioration of their efficiency. For a mechanical cleaning of the filter cloths, the latter are exposed to water jets of high pressure. For this purpose, washing pipes are used which have a number of spray nozzles. The length of the pipes generally corresponds to the width of the filter plate or, in some particular cases, to the height thereof. For performing the cleaning operation, the filter plates are, one-by-one, shifted away from the filter plate stack and positioned such that they are flanked by free space on both sides. The washing pipes are moved slowly either vertically, for example, from above downwardly or horizontally from one side to another, while cleaning water is ejected under high pressure from the nozzles onto the filter cloth to be cleaned. The cleaning effect in such an arrangement is dependent not only from the pressure of the spray water and the type of the nozzle but also from the distance of the nozzles from the filter cloth. In order to ensure that this distance is maintained constant, in one type of cleaning system the free space on either side of the displaced filter plate is selected to be small and the washing pipe or tube which is provided bilaterally with nozzles, is introduced into the clearance, so that in each instance the two filter plates which define the clearance are simultaneously cleaned.

In a different type of cleaning system, the filter plate to be cleaned is moved towards the open side of the press into a predetermined detached position, so that two washing tubes can straddle the filter plate to be cleaned in a fork-like manner with nozzles directed to one another, so that upon upward and downward movement of the washing tubes, both sides of the filter plate are simultaneously cleaned.

The use of the above-described two cleaning systems is, among others, dependent upon the structure of the filter press stand. In both cleaning systems, however, there are encountered the basic problems of moving the filter plate to be cleaned into an accurate, predetermined position and an accurate control of the washing device. Particularly, an accurate guidance and positioning of the washing device in the clearance at the detached filter plate poses problems, because such free space between the detached filter plate and the filter plate stack on either side thereof continuously changes as the filter plate stack on the closed side is reduced and the filter plate stack on the open side is built up.

SUMMARY OF THE INVENTION

It is an object of the invention to provide an improved plate-type filter press of the above-outlined type in which the extent of displacement of each filter plate with regard to the filter press stand is monitored for a reliable displacement-dependent control of the drive of the plate shifting arrangement and the motions of auxiliary equipment, particularly a washing apparatus.

This object and others to become apparent as the specification progresses, are accomplished by the invention, according to which, briefly stated, the plate shifting arrangement of the filter press is operatively coupled with a displacement sensor which, in turn, emits signals which characterize the momentary position of the shifting device relative to the guide carrier and which are applied to a displacement monitoring and control device.

The invention as outlined above provides that the length of displacement of the filter plates when moved by the plate shiftig apparatus is continuously determined and based upon such determination, the proper follow-up signals are emitted.

According to a further advantageous feature of the invention, the displacement sensor is a digital signal transmitter connected with a forward and backward counter associated with the displacement monitoring and control device. Such a displacement measuring and sensing system provides that the continuously shifting clearance between the momentarily outermost filter plates of the filter plate stack on the closed side and the open side of the filter press is coordinated with the motions and the positioning of the filter plates and/or the washing apparatus. Further, it is feasible to program the monitoring and control device in such a manner that, for example, counting pulses characterizing the plate thickness can be additionally taken into account.

According to a further feature of the invention, the control device includes an arrangement for affecting the shifting speed of the plate shifting apparatus. In this arrangement the extent of displacement effected by the plate shifting apparatus is determined by means of the counting pulses of the displacement sensor. The length of such a displacement corresponds to the clearance between the outermost filter plate of the stack at the open side and the outermost filter plate of the stack at the closed side (which is the filer plate to be shifted next) as well as to the path length which the plate-engaging elements of the plate shifting apparatus have to travel for engaging the next filter plate to be shifted.

The control device is so programmed that during the shifting of each filter plate towards the open side of the press (rearward travel), prior to the travel of the full length (which has been precedingly determined upon the forward travel), a control pulse is emitted which changes the rpm of the drive of the shifting apparatus into a lower rpm value, so that the plate which is being shifted is decelerated and is brought softly to the stack of the filter plates at the open side of the press. In the same manner the accelerating forces can be reduced at the beginning of the plate shifting; in this case a predetermined number of counting pulses may be applied to the control device, so that the drive of the shifting apparatus operates with a reduced rpm before it is brought to the higher rmp's corresponding to the full operational speed. Instead of applying counting pulses, it is feasible to effect a multi-step or stepless acceleration of the drive of the plate shifting apparatus by means of timing relays. Such a control of the shifting speed at the starting of the shifting operation as well as during breaking of the plate to be shifted can be advantageously utilized also for all the other plate shifting processes, for example, for shifting the filter plates into a washing position which may be, for example, at the half-way point between the filter plate stack on the closed side and that on the open side. Such an arrangement is particularly advantageous in plate filter presses in which the filter plates are suspended from the guide carrier of the filter plate stand.

According to a further advantageous feature of the invention, the traveling carrier element of the shifting apparatus is formed at least by one endless roller chain on which the plate engaging elements are mounted and further, the motor which drives the roller chain is connected with an angle coder which constitutes the displacement sensor. This arrangement has the advantage that, on the one hand, between the drive motor and the plate engaging elements there is provided a firm, slip-free connection and, on the other hand, the angle coder which senses the lengths of path traveled by the plate engaging elements by determining the rotary angle of the motor, can be arranged stationarily on the press stand. This eliminates the inconvenience and the danger of operational disturbances of cables and conductors that would have to be otherwise carried back-and-forth as the plate engaging elements travel.

Another advantageous feature of the invention is provided in a plate filter press which includes a filter cloth washing carriage having its own drive and arranged for travel on the filter press stand in the longitudinal direction thereof. The carriage has at least one washing tube secured to a sled which, by means of a drive, is movable transversely to the longitudinal dimension of the press. Thus, according to the invention, the washing carriage is operatively coupled with a displacement sensor, the signals of which are applied to the monitoring and control device of the filter plate shifting apparatus. The latter, in turn, is connected with a device for controlling and driving the washing carriage as a function of the position of the plate engaging elements of the plate shifting apparatus. This arrangement provides that the filter plate to be washed is moved into an intermediate position between the two filter plate stacks on the closed side and the open side of the press and that subsequently, the washing carriage is moved into its proper position with respect to the filter plate to be washed. Since by means of the monitoring and control device the the exact position of the filter plate with regard to the filter plate stand is determined, the motion of the washing carriage can be contolled with high accuracy.

In embodiments in which two washing tubes or pipes straddle, in a fork-like manner, the filter plate to be cleaned, spreader and abutment rollers, which otherwise maintain the distance between the washing tubes and the filter plate to be cleaned constant, may be omitted. This, at the same time, also means the elimination of all potential disturbances which such spacer rollers (which roll on the filter cloth in the sealing zones) may cause.

According to a further feature of the invention, the sled on which the washing tube is mounted is operatively coupled with a displacement sensor which, in turn, is coupled with the monitoring and control device of the filter plate shifting apparatus. This displacement sensor provides that the entire arrangement may be interlocked in such a manner that a filter plate shifting operation is possible only if the sled for the washing tube is situated in a predetermined terminal position. Thus, only when the sled assumes this terminal position, that is, the washing tube has cleared the path for the filter plates, can a motion of the filter plate that has just been grasped by the plate engaging elements, take place. Instead of a displacement sensor, a limit switch can be provided which applies a corresponding control signal to the monitoring and control device.

According to a further feature of the invention, the washing tube is pivotally mounted on the sled and is coupled with a bell crank lever and further, the washing carriage has an abutment which cooperates with the bell crank lever and which, under the effect of a corresponding motion of the sled towards a terminal position, effects a pivotal motion of the washing tube. This arrangement provides that the filter cloth washing arrangement can be moved away entirely from the path of motion of the filter plates if all the filter plates of the filter plate stack are already cleaned and a new filtering process can be started.

DESCRIPTION OF THE PREFERRED EMBODIMENTS

Figure 1:
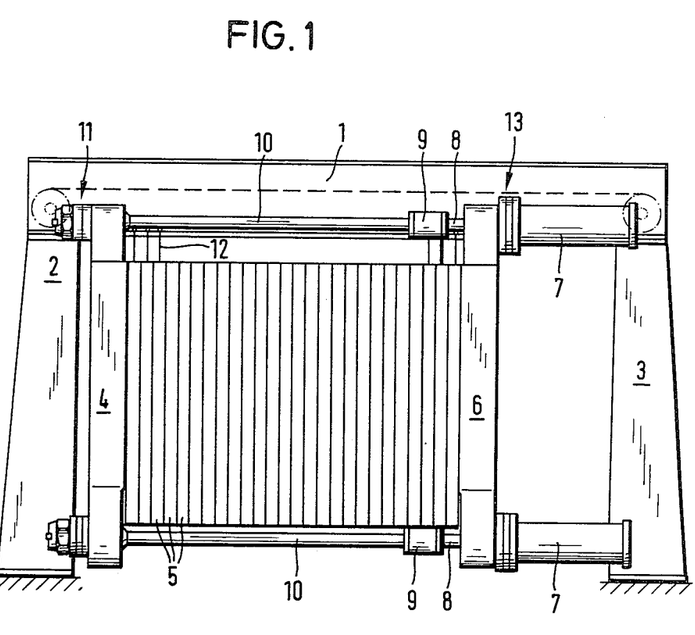
FIG. 1 is a schematic side elevational view of a filter press adapted to incorporate the invention.

Turning now to FIG. 1, the filter press shown therein is illustrated in its closed position which it maintains while the filtering operation is in progress. The filter press has an overhead guide carrier 1 which is supported at both ends by uprights 2 and 3. The guide carrier 1 is formed, for example, by an I-beam, from which there are suspended an end plate 4, a plurality of filter plates 5, as well as a head plate 6. The end plate 4 is stationarily positioned at the left-hand terminus of the guide carrier 1, while the head plate 6 is displaceably mounted thereon. The filter plates 5 are mounted on the lower flange of the guide carrier beam 1 by means of respective suspensions 12, by means of which the filter plates 5 can be shifted along the guide carrier 1 parallel to its longitudinal axis when the press is to be opened or closed. On the head plate 6, in the corner zone thereof, there are mounted four hydraulic power units 7. Each hydraulic power unit 7 is constituted by a piston-and-cylinder arrangement, the piston rod 8 of which is connected by means of a coupling 9 with pull rods 10. The latter, in turn, are connected with the end plate 4 with the intermediary of spherical bearings 11. The hydraulic power units 7 are, in a manner not described in more detail, connected to a hydraulic fluid source with the intermediary of a control device so that during the filtering process, the filter plate stack is compressed with the required closing pressure. Apart from such a closing pressure, the filter plates of the filter plate stack are firmly locked to one another in a manner described later, so that after completion of the filtering process the head plate 6 may be shifted towards the right from its shown closed position to an open position by means of the hydraulic power units without thereby causing the filter plates to move away from one another.

Figure 6:
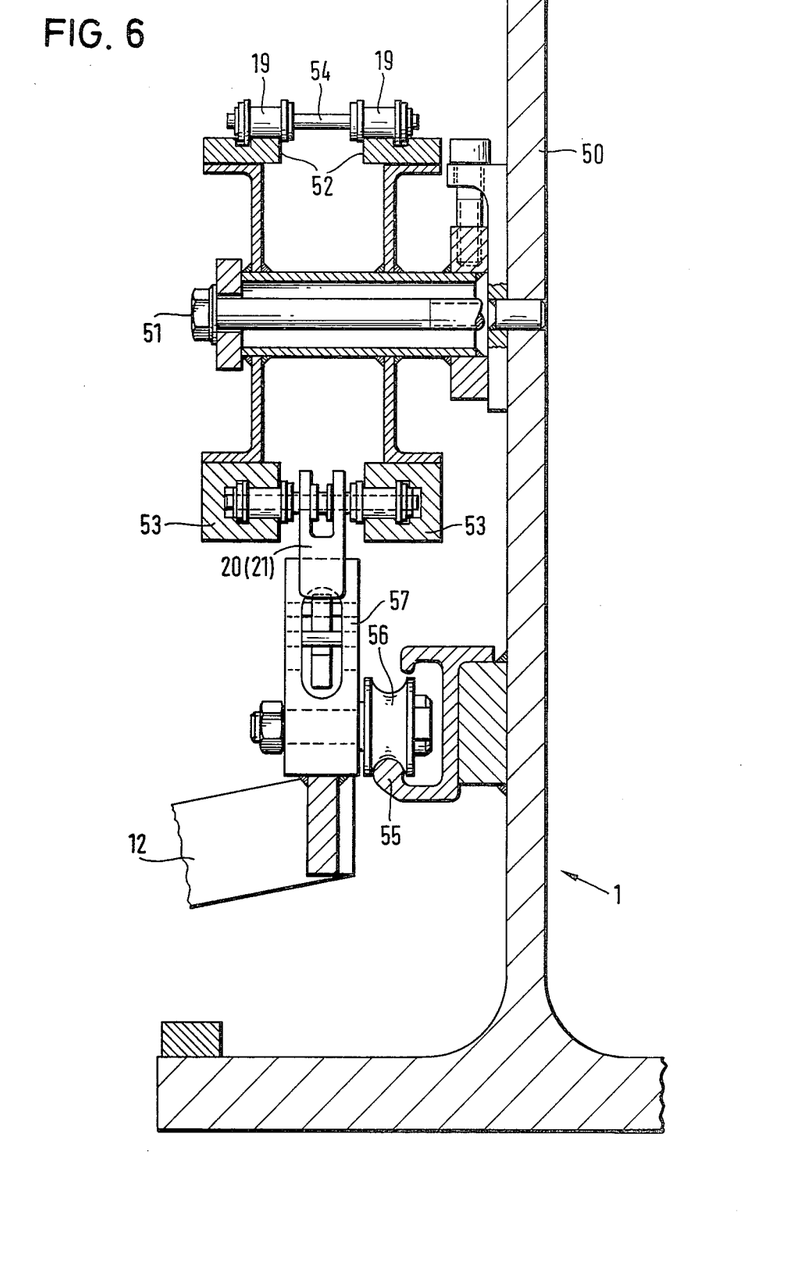
FIG. 6 is a sectional end elevational view of a plate shifting apparatus forming part of the filter press according to the invention.

By means of a plate shifting apparatus 13 which extends along the length dimension of the guide carrier 1 at the height of the suspensions 12 and which will be described in more detail in connection with FIGS. 6, 7 and 8, the filter plates are, for ejecting the filter cakes and/or washing or rinsing, individually and in sequence moved from their closed position towards the head plate 6. The shifting apparatus, prior to moving the outermost filter plate of the stack towards the head plate 6, causes an unlocking of the outermost filter plate from the adjoining filter plate that still forms part of the filter plate stack on the closed side of the press. As will be described later, the filter plate which undergoes displacement is, as it engages the filter plate at the open side of the press, locked to the latter, whereby an interlocked filter plate stack is being built up at the open side of the press. Before initiating the filtering process, the filter plates are shifted simultaneously by means of the hydraulic power units 7 with the intermediary of the head plate 6 as a unit back towards the end plate 4 and thereafter the filter plates are pressed thereagainst with the pressure required for the filtering operation.

A preferred embodiment of a displacement sensing and control device will now be described in conjunction with FIG. 2 which shows a filter press that also includes a filter cloth washing carriage 18.

Figure 2:
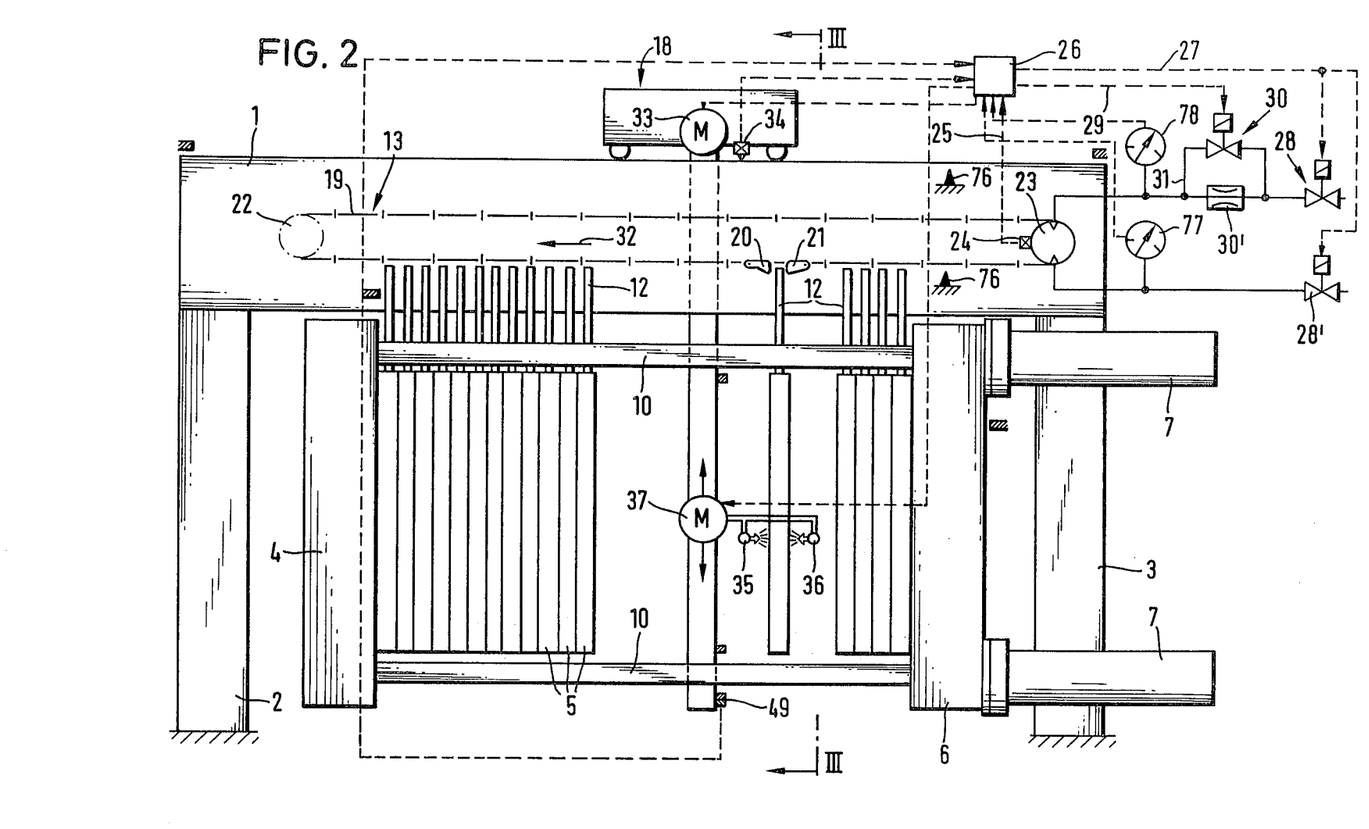
FIG. 2 is a schematic side elevational view of a filter press and associated washing apparatus incorporating a preferred embodiment of the invention.

The filter plate shifting apparatus 13 has, according to the embodiment of FIG. 2, two parallel-arranged, horizontally spaced endless roller chains 19 on which plate engaging elements formed of two levers 20 and 21 are pivotally mounted. The lever 20 serves as a shifting lever, whereas the lever 21 functions as a reversing lever. The mode of operation of this arrangement will be described in greater detail in connection with FIGS. 7 and 8. Both levers 20 and 21 are supported between the two roller chains 19 by pivot pins which also serve for coupling the two roller chains 19 to one another thus ensuring that they are guided in a parallel manner. The roller chains 19 are trained about an idling sprocket 22 at one end and, at the other end, are trained about a driven sprocket which is connected with a hydraulic drive motor 23. Since by means of the roller chains 19 a slip-free connection between the drive motor 23 and the plate engaging elements 20, 21 is ensured, as a displacement measuring device an angle coder may be used which is connected with the shaft of the driven sprocket and which functions as a digital signal transmitter. An output 25 of the angle coder—whose structure will be described later—is connected to a forward and backward counter $Z_1$ in a monitoring and control device 26. An output 27 of the monitoring and control device 26 is connected with a solenoid valve 28 of the hydraulic drive motor 23 for one direction of rotation so that each time the plate engaging elements 20, 21 travel a distance predetermined by the control device in one direction, the hydraulic fluid supply to the drive motor 23 is interrupted. Another output is connected with another valve 28′ for the other direction of rotation.

A further conductor 29 connects the monitoring and control device 26 with a valve 30 of a bypass conduit 31 bridging a flow regulator 30′, so that by closing valve 30 the motor 23 drives with slow speed.

After the filter press is opened by shifting the head plate 6 towards the right as viewed in FIG. 1, the hydraulic drive motor 23 moves the roller chains 19 with its levers 20 and 21 from the original zero position 76 in the direction of the arrow 32 until the levers 20 and 21 flank a projection of the suspension 12 of the first (outermost) filter plate of the still-interlocked filter plate stack on the closed side of the filter press. As the lower flight of the roller chains 19 continues to be urged in the direction 32, the reversing lever 21 is pressed against the above-noted projection of the outermost filter plate and, as a result, there is effected, by means of a pressure-responsive reversing control 77 for the hydraulic motor 23, a reversal of its direction of rotation, so that now the elements 20, 21 are advanced against the direction of the arrow 32. Upon such a reversal, the shifting lever 20 causes an unlocking of the outermost filter plate from the remainder of the filter plate stack and thus this filter plate can now be shifted in the direction of the head plate 6.

By means of a timing relay which is not illustrated in detail, or with the aid of the signals emitted by the angle coder 24, the conveying speed of the filter plate may be stepwise or steplessly increased by the monitoring and control device 26 so that the accelerating forces affecting the suspended, moving filter plate are maintained within limits. Since in the course of the earlier motion of the elements 20, 21 in the direction of the arrow 32 the length of the traveled path was measured by the angle coder 24 from a predetermined zero position, by appropriately pre-setting the monitoring and control device 26, the traveling speed of the filter plate can be reduced in several steps or in a stepless manner—for example, by opening the bypass valve 30—shortly prior to its reaching its terminal position. Thus, the transported plate arrives gently in its terminal open position at the filter plate stack which has already been formed at the open end of the filter press, next to the head plate 6. As the elements 20, 21 are continued to be urged towards the right, the shifting lever 20 is pressed against the just-transported filter plate, whereupon the pressure-responsive switching device 78 again reverses the rotational direction of the motor 23. Thus, the elements 20, 21 move again in the direction of the arrow 32. During this travel, the angle coder 24 measures the displacement from the new starting position 76—which is spaced from the original zero position—to the point at the closed side of the press, where again a reversal of the rotary direction of the motor 23 takes place. By means of the forward and backward counter of the monitoring and control device 26, there are again determined anew the paths where the acceleration and the deceleration are to take place. Thus, in this manner an automatic control of these motions is effected.

Figure 3:
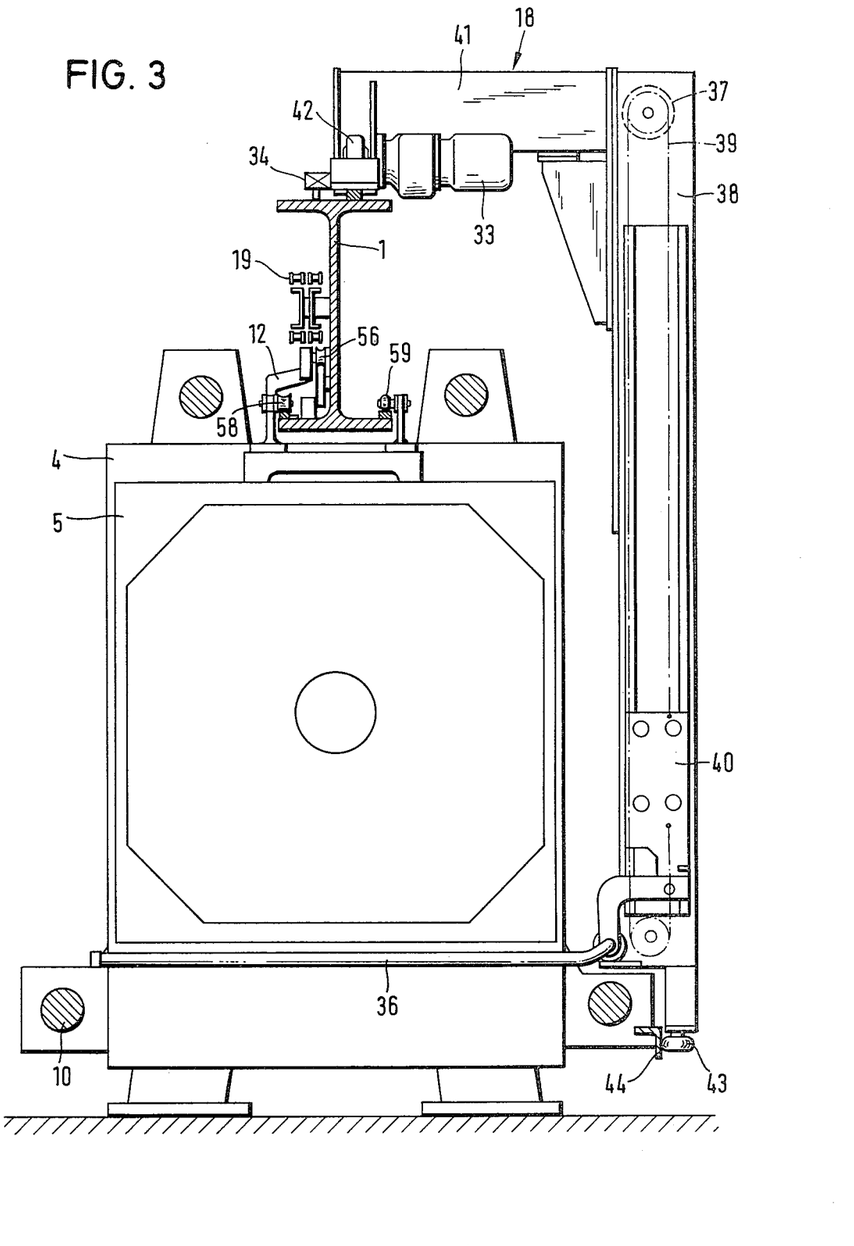
FIG. 3 is a schematic sectional view taken along line III—III of FIG. 2.

Since with the aid of the above-described displacement measuring system for each point in time, the exact position of the traveling filter plate can be determined with regard to the guide carrier or, as the case may be, with regard to a predetermined zero position, the measuring system can also be used for controlling the filter cloth washing carriage 18. Structural details of the washing device will be described in conjunction with FIGS. 4 and 5. The filter cloth washing carriage 18 travels on the guide carrier 1 and is propelled by its own drive motor 33 which may be either fixedly mounted on the carriage 18—as shown in FIG. 3—or may be mounted stationarily on the filter press stand. In the latter case the carriage 18 is moved along the guide carrier 1 similarly to the plate engaging elements of the plate shifting apparatus, by a traveling carrier element such as an endless roller chain.

The washing carriage 18 is associated with a displacement sensor structured in the same manner as the displacement sensor 24 of the plate shifting apparatus. Thus, in this example, a corresponding angle coder 34 is to be used. If, for moving the carriage 18, an endless roller chain is utilized, then the angle coder associated with the carriage 18 is, similarly to the angle coder 24, connected with a sprocket at the drive motor 33. If, as shown in FIG. 2, the drive motor 33 is directly mounted on the carriage 18, in the zone of its guide track a toothed rack or the like is affixed to the guide carrier for cooperating with the angle coder 34 which is mounted on the carriage 18. The signals generated by the angle coder 34 are applied to the monitoring and control device 26.

The carriage 18 has two washing tubes 35 and 36 which straddle in a fork-like manner the filter plate to be cleaned. For performing the washing operation, by means of the plate engaging elements 20 and 21 the outermost filter plate is moved away from the filter plate stack situated at the end plate 4 and is stopped approximately in the mid zone of the clearance defined between the two outermost filter plates on the closed side and open side of the filter press. The pulses of the angle coder 24 are additionally applied to a preset counter. The precise position of the filter plate on the guide carrier is thus sensed by the monitoring and control device 26, so that by means of a proper follow-up signal, the drive motor 33 of the carriage 18 is energized to rotate in the proper direction. Since, at the same time, by means of the angle coder 34, the position and the traveled path of the carriage 18 is determined, the carriage 18 can be stopped precisely at a predetermined distance from the filter plate to be cleaned. Then, by means of further follow-up signals, the washing process can be performed, during which the washing tubes 35 and 36 are moved up and down with the aid of a drive motor 37.

As soon as the washing process is terminated, the washing tubes 35, 36 are lowered, whereby the cleaned filter plate is freed (as will be described in connection with FIGS. 4 and 5), the plate shifting apparatus is again energized and the cleaned plate moved from its washing position and is pressed against the filter plate stack situated at the head plate 6. Then, as described earlier, the filter plate engaging elements 20, 21 are freed and the direction of motion of the drive motor 23 is reversed, so that the next filter plate can be brought into the washing position from the filter plate stack still dwelling at the end plate 4. As the filter plate stack is built up at the head plate 6, there occurs simultaneously a corresponding reduction of the filter plate stack at the end plate 4 and thus, the location at which consecutive filter plates to be cleaned have to be situated for the washing operation shifts continuously. Since, however, by means of the monitoring and control device 26 and with the aid of the displacement measuring device 24, the traveled path is determined, a shift of the location where the individual filter plates must stop and the associated shift of the location where the carriage 18 has to be successively positioned can be accurately effected by a logic circuit of the control device 26.

Turning now to FIG. 3, there is shown in greater detail the structure of the filter cloth washing carriage 18. The latter has a vertical guide beam 38 on which there is mounted a sled 40 which carries the washing tubes 35, 36 and which is vertically reciprocated on the beam 38 by means of a chain 39. The chain 39 is moved by a drive motor 37 which is connected with the monitoring and control device 26. At its upper end, the guide beam 38 has a transverse member 41 provided with runner wheels 42 which travel on the guide carrier 1 and by means of which the beam 38 is suspended. At least one of the wheels 42 is operatively connected with the drive motor 33. The lower end of the guide beam 38 engages, with a runner wheel 43, a guide rail 44 which is secured either to the press stand or is supported on the floor. The length of the filter plates 5 is expediently so dimensioned that they can be shifted clear past the washing tubes 35, 36 when the latter are in their lowermost position (in FIG. 3 only the washing tube 36 is visible). As soon as a filter plate is brought, with the aid of the plate shifting apparatus 13, into the washing position and the carriage 18 is also brought into its corresponding operational position as described in connection with FIG. 3, the washing tubes 35 and 36 are moved up and down along the filter plate by means of the sled 40. At the same time, water is ejected under high pressure onto the filter cloth, whereby the filter cloth is cleaned. As soon as the sled 40 has again reached its lowermost position, the water supply is shut off and subsequently, a new filter plate is brought into the washing position so that the latter can be cleaned in the same manner.

The sensing of the position of the washing carriage 18 for each point in time is effected by the angle coder 34 which, as noted earlier, is mounted on the carriage 18 and which has a sensor wheel formed as a sprocket. The sprocket runs on a measuring chain secured to the guide carrier 1. As an alternative, it is feasible, however, to connect the angle coder 34 directly with the shaft of one of the runner wheels 42 which then, for this purpose, is a gear that runs on a toothed rack affixed to the guide carrier. It is of significance in this arrangement that the displacement measuring device, for example, the above-described angle coder 34, operates in a slip-free manner so that even during longer operational periods no measuring differences can occur between the measured paths of the plate shifting apparatus 13, on the one hand, and the filter cloth washing carriage 18, on the other hand.

The supply and control cables associated with the drive motors 33 and 37 and the traveling path measuring devices as well as the hoses for the pressurized water supply can be secured in a known manner by means of a cable drag chain on the guide carrier 1 and the guide beam 38.

Figures 4, 5:
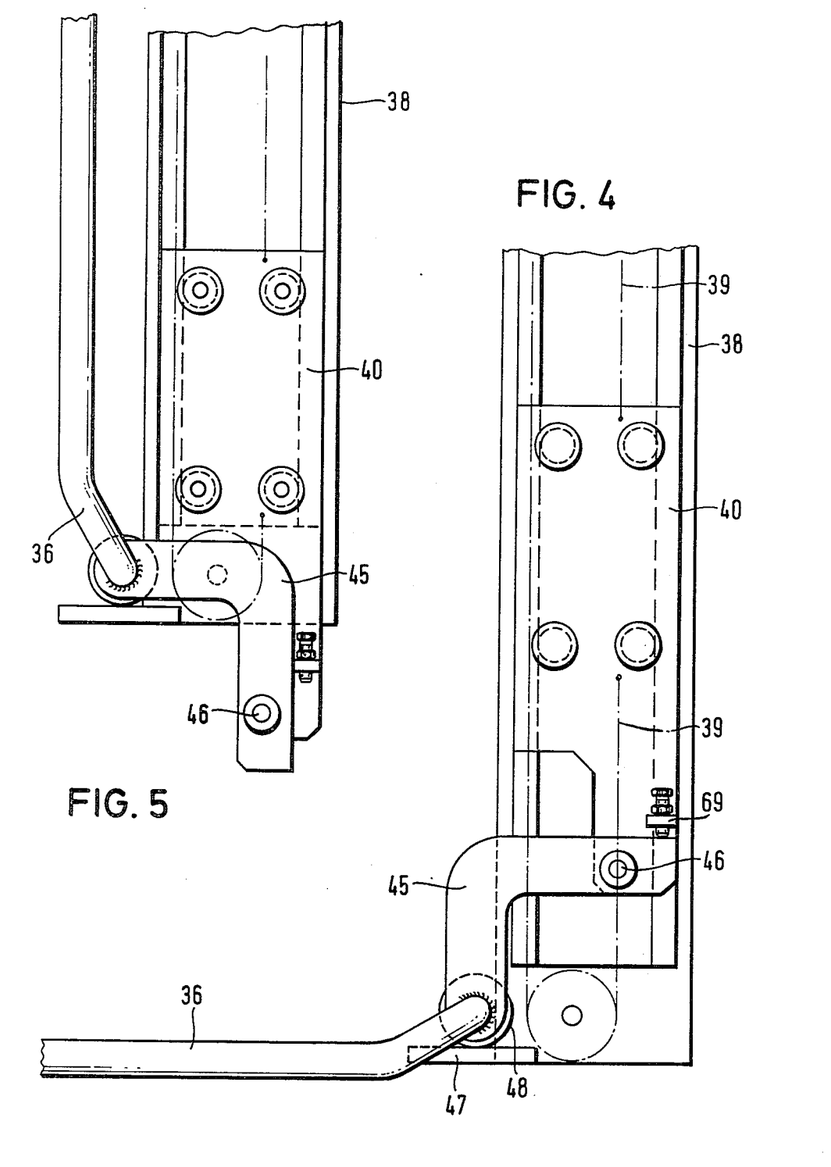
FIGS. 4 and 5 are end elevational views of a detail of the washing apparatus shown in FIG. 2, illustrated in an operational and a withdrawn position, respectively.

Turning now to FIGS. 4 and 5, there are shown, on an enlarged scale, particular structural features of the above-described filter cloth washing carriage 18. The washing tubes 35 and 36 (only the latter is visible) are secured to an angle lever 45 which is swingably supported on the sled 40 by means of an articulation 46. By means of a preferably adjustable stop 69 affixed to the sled 40, the angle lever 45 and thus the washing tubes 35, 36 are held in the illustrated horizontal position so that upon an upward and downward movement of the sled 40, the washing tubes can scan the filter plate surface to be cleaned.

At the lower end of the guide beam 38 there is provided a stop 47 which is engaged by a follower roller 48 mounted on the free end of the angle lever 45. After the last filter plate is cleaned, the sled 40 is, with the aid of the chain drive 39, moved downwardly from its position shown in FIG. 4. Since the roller 48 is retained at the stop 47, the angle lever 45 is pivoted clockwise (as viewed in FIG. 4) until the washing tubes 35 and 36 assume a vertical end position as shown in FIG. 5. The distance of the guide beam 38 from the filter plate stack is so designed that the carriage 18 can move past the filter plate stack into a terminal position thus ensuring that it does not disturb the normal filtering operation and that it is out of the way particularly when, for ejecting the filter cakes, the filter plate stack is again opened.

The chain drive 39 for the sled 40 may be connected either with a displacement sensor or, as shown in FIG. 2, with a limit switch arrangement 49 connected to the monitoring and control device 26. This ensures that a displacement of the filter plates is possible only when first the washing tubes 35 and 36 assume their lowermost position as illustrated in FIG. 4. The limit switch arrangement may be so structured that a displacement of the carriage 18 into its end position, for example, in the zone of the stand 2, is possible only after the washing tubes 35, 36 have been moved into their vertical position as shown in FIG. 5. This arrangement involves electric or electronic locking circuits of conventional nature.

The plate shifting apparatus will now be described in more detail in conjunction with FIG. 6 which is a sectional illustration taken in a plane that is perpendicular to the length dimension of the filter press.

To the web 50 of the guide carrier beam 1 there are affixed a plurality of supports 51 which are evenly distributed along the length of the press. The supports 51 carry a pair of upper, horizontally spaced rails 52 and a pair of lower horizontally spaced rails 53. The rails 52, 53 which are preferably of a synthetic material, are provided with recesses for guiding the roller chains 19 therein. It is thus seen that there are provided two endless parallel-running, spaced roller chains 19 each having an upper flight which is guided by a respective upper rail 52 and a lower flight which, in turn, is guided by a respective lower rail 53. The two roller chains 19 are firmly connected with one another by spacer pins 54. To the lower flight of the roller chains 19, as shown in detail in FIGS. 7 and 8, there are pivotally secured the levers 20 and 21. Underneath the chain guide assembly formed of the plurality of supports 51 as well as the guide rails 52 and 53, there is provided a rail 55 which is secured to the web 50 of the guide carrier 1 and on which may travel a roller 56, forming part of each filter plate suspension 12. At the upper end of each suspension 12 there is affixed a projection 57, the forwardly and rearwardly oriented faces of which are adapted to be engaged by the free ends of the levers 20 and 21, respectively. As seen in FIG. 3, on the suspension 12 there are further mounted two additional rollers 58 and 59 which are guided on the upper face of the lower flange of the guide carrier beam 1. The three rollers 56, 58 and 59 are so arranged with respect to one another that they provide for a three-point contact resulting in a swing-free guidance of each filter plate. It is noted that this type of filter plate suspension does not form part of the invention. Such a suspension forms the subject of U.S. Patent Application Ser. No. 841,311, filed Oct. 11, 1977 and assigned to Eberhard Hoesch & Söhne GmbH & Co., Düren (Federal Republic of Germany), now U.S. Pat. No. 4,159,249 issued June 26, 1979.

Figure 7:
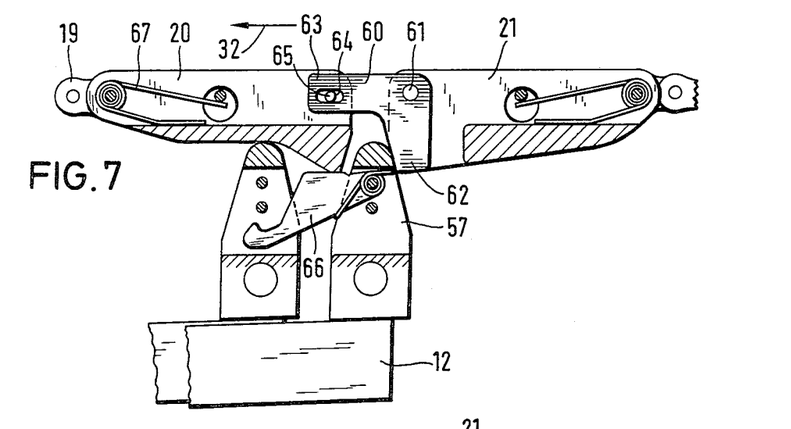
FIGS. 7 and 8 are sectional side elevational views of plate engaging elements of the plate shifting apparatus, illustrated in different operational positions.

Reverting once more to FIG. 7, the two levers 20 and 21 are coupled with one another by means of a bell crank lever 60 which is pivotally mounted by means of a pivot pin 61 to the lever 21 at a top region thereof. The free end 62 of the bell crank lever 60 serves as an abutment for turning the bell crank lever 60 counterclockwise and is thus adapted to contact the projection 57 of the outermost filter plate in the stack at the closed side of the press during the displacement of the levers 20, 21 in the direction of the arrow 32.

The free end 63 of the bell crank lever 60 projecting beyond the reversing lever 21 is provided with a slot 64 through which passes a pin 65 affixed to the shifting lever 20. In this manner a form-locking connection is maintained between the reversing lever 21 and the shifting lever 20.

In the description which follows, the operation of the above-described plate shifting apparatus will be set forth with reference to FIGS. 7 and 8.

During the travel of the chains 19 in the direction of the arrow 32, as the leg 62 of the bell crank lever 60 abuts the projection 57 of the outermost filter plate of the filter plate stack at the end plate 4 and the chains 19 are continued to be urged by the motor 23 in the direction of the arrow 32, the bell crank lever 60 is pivoted counterclockwise, whereby the shifting lever 20 is pivoted clockwise downwardly into its position shown in FIG. 7. This causes a locking hook 66 articulated to the projection 57 to pivot downwardly and thus disengage from a locking pin affixed to the projection 57 of the adjoining filter plate of the filter plate stack. At the end of the pivotal motion of the locking hook 66, the chains 19 can no longer be moved in the direction of the arrow 32 because lever 21 is pressed against the projection 57 so that the pressure increase caused by the resistance to the chain travel in the hydraulic motor 23 of the plate shifting apparatus causes a reversal of the rotary direction. Consequently, the chains 19 will then be moved in a direction opposite the arrow 32. A spring 67 held on the pivot of the shifting lever 20 maintains the latter in the illustrated position so that the projection 57 of the suspension 12 is maintained between the two levers 20 and 21 substantially in a form-locking manner. Upon stoppage of the chains 19, for example, in the washing position of a filter plate, the traveling filter plate is also stopped and, by virtue of the bilateral positioning between the levers 20 and 21, it cannot continue its travel by its own inertia. This arrangement thus provides an accurate positioning of the filter plate, since the play which is required for unlocking the filter plates from one another and for reversing the rotation of the motor 23 and which occurs between the two work faces of the levers 20 and 21 is negligible regarding the displacement measurement and the filter plate positioning.

Figure 8:
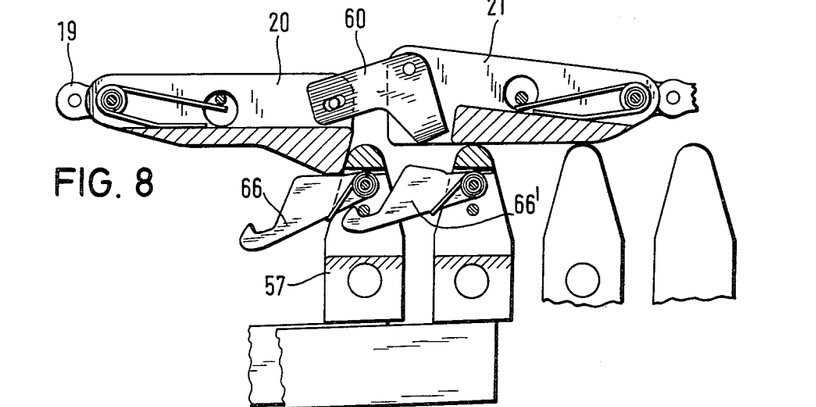

Turning now to FIG. 8, there is illustrated the arrival and the locking of the just-transported filter plate to the filter plate stack at the head plate 6 (that is, at the open side of the filter press). During this phase, the reversing lever 21 runs up on the upper edge of the projections 57 of the filter plates which are already at the open side, without the shifting lever 20 being lifted from its conveying position (in which it engages the projection 57 of the filter plate undergoing displacement). As soon as the filter plate which undergoes displacement is moved to the filter plate stack at the head plate 6 and is locked to the stack by means of the locking hook 66′ of the previously shifted filter plate engaging behind the locking pin of the filter plate that has just arrived, there again occurs a reversal of the direction of rotation of the drive motor 23 of the chains 19, whereby the reversing lever 21 slides, in its position illustrated, over the upper edge of the projection 57 of the just-shifted filter plate and pivots downwardly (counterclockwise) only after it leaves the filter plate stack at the head plate 6.

After all the filter plates have been brought into mutual engagement adjacent the head plate 6, both levers 20, 21 are, in the direction of the arrow 32, moved again into their initial position by causing them to travel over the sprocket 22 and the upper flight of the chains 19 to the right-hand end of the press stand. In this manner the levers 20, 21 are moved entirely clean of the filter plate stack. Thereafter, the filter plates can be shifted towards the end plate 4 as a unit by the hydraulic power units 7 and a new filtering process may start.

Figure 9:
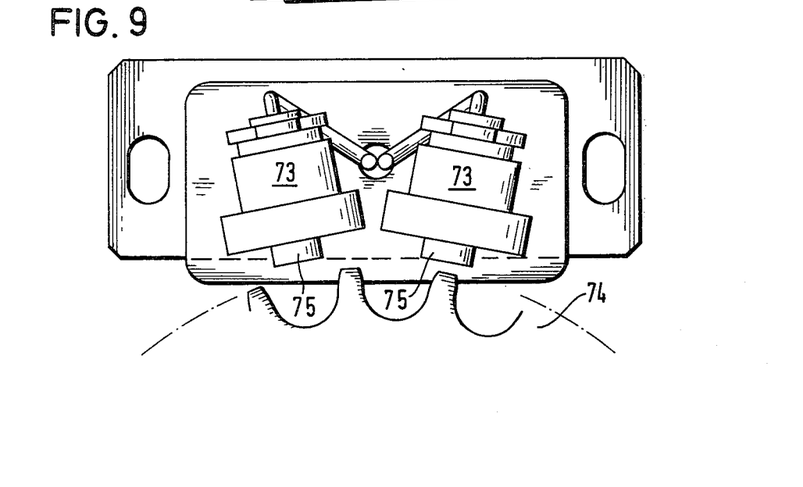
FIG. 9 is a schematic view of a digital displacement measuring device according to the invention.

Instead of the above-described angle coder 24 or 34, a magnetic, capacitive or inductive sensor 73 may be used as illustrated in FIG. 9. Such a sensor emits an electric pulse as the teeth of the sprocket 74 of the motor 23 (or the motor 33) moves past. In case two sensors are used whose sensor heads 75 are arranged at a spacing of 1½ sprocket teeth, there is obtained a pulse number of higher frequency, resulting in a correspondingly more accurate traveling path measurement.

For a better understanding of the relationship between the individual, mutually dependent motions of the shifting apparatus 13, on the one hand, and the washing carriage 18, on the other hand, in a filter press having a washing apparatus, the linkage of the individual motions will be explained in more detail in conjunction with the logic flow chart illustrated in FIG. 10. In this connection it is to be noted that the monitoring and control device 26 is provided with three counters. The counter $Z_1$ is so designed that it can count forward and backward, that is, it can process both positive and negative signals. With the counter $Z_1$ there is connected the angle coder 24 or a corresponding pulse generator for generating displacement-dependent pulses so that both the path traveled by the shifting apparatus 13 and the direction of the displacement are sensed. The counter $Z_1$ starts counting from 0 as soon as a part associated with both levers 20 and 21 passes by a 0-marking provided on the press stand in the form of an initiator 76 during a displacement in the direction of the arrow 32.

With the counter $Z_1$ there is further connected the angle coder 34 mounted on the washing carriage 18 and the circuit is so arranged that the pulses coming from the washing carriage during a displacement in the direction of the arrow 32 are subtracted from the positive pulses given earlier by the shifting apparatus.

The angle coder 34 of the washing carriage 18 is further connected with a settable counter $Z_2$, by means of which a displacement $x_1$ for the washing carriage may be predetermined. The displacement $x_1$ corresponds to one half of the opening clearance when the head plate 6 is in its open position, but before the first filter plate 5 is moved at all. The counter $Z_2$ is set only at the beginning of the washing process and after the washing carriage 18 has traveled the path $x_1$, it remains at the 0 setting and has no significance for the further course of the washing process until the press is again opened for the next cleaning process.

Finally, there is provided a counter $Z_3$, by means of which, similarly to the counter $Z_2$, a fixed path $x_2$ can be predetermined. This counter $Z_3$ is connected with the angle coder 24 and its circuitry so arranged that it counts backward towards 0 the predetermined number of pulses which corresponds to the displacement $x_2$. The counter commences counting each time the shifting apparatus 13 moves, subsequently to the reversal of the direction of rotation, opposite the direction of the arrow 32 and moves a disconnected plate into the washing position. The circuit is further so arranged that the path $x_2$ is automatically preset when a filter plate is to be displaced into the washing position in a direction opposite to the arrow 32. The displacement $x_2$ here corresponds approximately to one half of the opening clearance, but is always measured from the last filter plate of the filter plate stack contacting the end plate 4. In this manner it is ensured that the washing position for the respective filter plate to be washed is always at the same distance from that part of the filter plate stack which is still to be washed.

Figure 10:
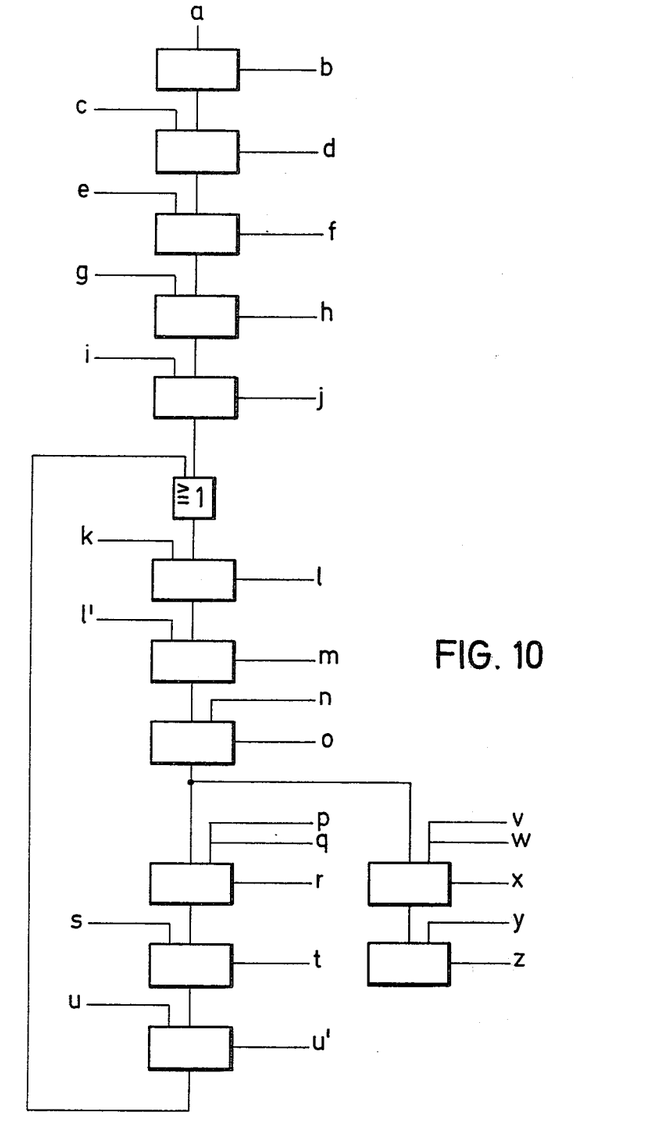
FIG. 10 is a schematic logic flow chart illustrating the washing and transporting process for the filter plates after opening the filter press.

The operation of the individual counters and the linkage of the individual switching commands can be seen from the logic flow chart shown in FIG. 10. The meaning of the referenced signals and commands in the individual stages is explained in the schedule below. The circuit linkages that can be gleaned from this schedule are not shown entirely in the schematic illustration of FIG. 2. These are, however, circuit arrangements which are well known to every person skilled in the art, so that they need not be described in detail.

a = starting signal;
b = the hydraulic cylinders 7 pull back the head plate 6 (opening of filter);
c = signal indicating "filter open";
d = the shifting apparatus 13 advances in the direction "32"; the counter $Z_1$ counts in the positive sense from the 0-marking 76 the displacement pulses of the shifting apparatus;
e = signal from the pressure switch 77 indicating "lever 21 engages the first filter plate";
f = the carriage 18 moves in the direction "32"; the counter $Z_2$ is set to $x_1$, it counts to zero in the negative sense; the counter $Z_1$ counts in the negative sense starting from the 0-marking 76 the displacement pulses of the washing carriage;
g = signal from the counter $Z_2$ indicating "washing carriage has reached position $x_1$";

h = the washing carriage stops; the washing tubes 35, 36 are pivoted downward from the vertical rest position into the basic position;

i = signal indicating "washing tubes in basic position";

j = the shifting apparatus moves backward; the counter $Z_1$ counts in the negative sense the displacement pulses of the shifting apparatus; the counter $Z_3$ is set to $x_2$ and counts in the negative sense to 0;

k = signal from counter $Z_3$ indicating "$x_2$ has been reached";

l = washing carriage moves in the direction "32"; the counter $Z_1$ counts in the negative sense the displacement pulses of the washing carriage until counter $Z_1$ reaches 0 (residual displacement);

l' = signal from counter $Z_1$ indicating "zero position" (washing position has been reached);

m = the washing tubes move upward; after short upward displacement, "water supply on";

n = signal indicating "washing tubes in upper position";

o = the washing tubes move downward;

p = signal indicating "washing tubes in lower position"; shortly therebefore "water supply off";

q = signal indicating "not the last filter plate";

r = the shifting apparatus moves the cleaned filter plate towards the head plate 6; the counter $Z_1$ counts in the negative sense the displacement pulses of the shifting apparatus;

s = signal from the pressure switch 78 indicating "filter plate is in engagement";

t = the shifting apparatus moves in direction "32"; the counter $Z_1$ counts in the positive sense the displacement pulses of the shifting apparatus;

u = signal from the pressure switch 77 indicating "lever 21 is in engagement";

u' = the shifting apparatus moves back with the filter plate; the counter $Z_1$ counts in the negative sense the displacement pulses of the shifting apparatus; the counter $Z_3$ set again to $x_2$ counts to 0 in the negative sense the displacement pulses of the shifting apparatus.

As seen in the flow chart, the output signal here is fed back as the signal k so that the above-described process is repeated until all the filter plates have been cleaned and have been displaced toward the head plate 6 by the shifting apparatus. By means of a corresponding signal generator which is not shown in detail, the signal q indicating "not the last filter plate" is then erased so that the successive switching steps can no longer be performed. At the same time, the signal v is applied to the corresponding circuit branch so that the following sequence is obtained:

v = signal indicating "last plate";

w = signal indicating "washing tubes in basic position";

x = the washing tubes are pivoted upward;

y = signal indicating "washing tubes are vertical";

z = the washing carriage moves into the rest position at the end of the press; the press can be closed so that a new filtering cycle may take place.

A person skilled in the art will readily recognize that a number of the above-discussed signals which indicate terminal positions, such as, for example, "washing tubes in upper position" or "washing tubes in lower position" can be generated in a manner well known to such a person, for example, by providing limit switches.

The counter $Z_1$ is not erased during the entire washing process in order to eliminate "adding errors" which may occur during repeated erasures and re-settings. Thus, the counter $Z_1$ starts to count when the predetermined spot of the shifting apparatus moves past the initiator 76 and thus repeatedly passes the "0" value in the positive and negative directions dependent upon the displacement of the shifting apparatus and the washing carriage. The "residual displacement" still to be traveled in each instance by the washing carriage until the washing tubes can be moved up and down is thus reliably sensed.

It is to be understood that the above description of the present invention is susceptible to various modifications, changes and adaptations, and the same are intended to be comprehended within the meaning and range of equivalents of the appended claims.

What is claimed is:

1. In a plate filter press having a length dimension and including a guide carrier extending in said length dimension; a plurality of filter plated oriented perpendicularly to said length dimension and being shiftably supported on the guide carrier for displacement towards a closed side and an opposite, open side of the filter plate press; a filter plate shifting apparatus for individually displacing the filter plates of a filter plate stack on the closed side towards the open side; the filter plate shifting apparatus having a drive motor, a traveling carrier element connected to the drive motor and filter plate engaging elements mounted on the traveling carrier element for being displaced by the drive motor back and forth in a clearance between the closed side and the open side of the plate filter press; the improvement comprising (a) a displacement sensor for emitting signals in response to the motion of said filter plate engaging elements in said length dimension; and (b) a monitoring and control means operatively connected to said displacement sensor for receiving said signals to monitor the momentary position of the successive traveling paths of said filter plate engaging elements with respect to said guide carrier to determine the required displacement characteristics for each filter plate as a function of the determined position; said monitoring and control means being further operatively connected to said drive motor for controlling the motion of said filter plate engaging elements for controlling the shifting motion of the individual filter plates as a function of said displacement characteristics.

2. In a plate filter press having a length dimension and including a guide carrier extending in said length dimension; a plurality of filter plates oriented perpendicularly to said length dimension and being shiftably supported on the guide carrier for displacement towards a closed side and an opposite, open side of the filter plate press; a filter plate shifting apparatus for individually displacing the filter plates of a filter plate stack on the closed side towards the open side; the filter plate shifting apparatus having a drive motor, a traveling carrier element connected to the drive motor and filter plate engaging elements mounted on the traveling carrier element for being displaced by the drive motor back and forth in a clearance between the closed side and the open side of the plate filter press; and an auxiliary equipment including components arranged for shifting motion along paths of displacement; the improvement comprising (a) a displacement sensor for emitting signals in response to the motion of said filter plate engaging elements in said length dimension; and (b) a monitoring and control means operatively connected to said displacement sensor for receiving said signals to monitor the momentary position of said filter plate engaging elements with respect to said guide carrier; said monitoring and control means being further operatively connected to said auxiliary equipment for controlling the displacement of said components of said auxiliary equipment as a function of the position of said filter plate engaging elements.

3. A plate filter press as defined in claim 1 or 2, wherein said displacement sensor is a digital signal transmitter and further wherein said monitoring and control means includes a forward and backward counter connected to said digital signal transmitter for counting the signals received therefrom.

4. A plate filter press as defined in claim 1 or 2, wherein said monitoring and control means includes means for controlling the speed of said drive motor for affecting the traveling speed of said filter plate engaging elements.

5. A plate filter press as defined in claim 1 or 2, wherein said traveling carrier element comprises an endless roller chain on which said plate engaging elements are mounted and which is connected to said drive motor; further wherein said drive motor is a rotary motor and further wherein said displacement sensor comprises an angle coder operatively coupled to said drive motor for responding to the angular displacements thereof.

6. A plate filter press as defined in claim 1, further comprising
(c) a washing carriage supported in said plate filter press for travel in said length dimension;
(d) an additional drive motor connected to said washing carriage for displacing said washing carriage in said length dimension;
(e) a sled mounted on said carriage for movement with respect to said carriage in a direction transverse to said length dimension;
(f) a washing tube mounted on said sled for directing a washing liquid onto the filter plates;
(g) an additional displacement sensor operatively connected to said washing carriage for emitting signals in response to the motion of said washing carriage; said additional displacement sensor being connected to said monitoring and control means for receiving the signals emitted by said additional displacement sensor; and
(h) carriage control means forming part of said monitoring and control means; said carriage control means being operatively connected to said additional drive motor for controlling the displacement of said washing carriage as a function of the position of said filter plate engaging elements.

7. A plate filter press as defined in claim 6 comprising a further displacement sensor operatively connected to said sled for emitting signals in response to the motion of said sled, said further displacement sensor being mounted to said monitoring and control means for receiving the signals emitted by said further displacement sensor.

8. A plate filter press as defined in claim 6, further comprising
(i) a guide beam mounted on said washing carriage and extending transversely to said length dimension; said sled being mounted on said guide beam for said movement with respect to said carriage;
(j) an angle lever pivotally mounted on said sled and carrying said washing tube; and
(k) an abutment provided on said guide beam and cooperating with said angle lever for effecting a swinging motion of said angle lever upon motion of said sled beyond a predetermined location on said guide beam for displacing said washing tube from an operative position into an inoperative position.

9. A plate filter press as defined in claim 2, wherein said auxiliary equipment comprises:
(a) a washing carriage supported in said plate filter press for travel in said length dimension;
(b) an additional drive motor connected to said washing carriage for displacing said washing carriage in said length dimension;
(c) A sled mounted on said carriage for movement with respect to said carriage in a direction transverse to said length dimension;
(d) a washing tube mounted on said sled for directing a washing liquid onto the filter plates;
(e) an additional displacement sensor operatively connected to said washing carriage for emitting signals in response to the motion of said washing carriage; said additional displacement sensor being connected to said monitoring and control means for receiving the signals emitted by said additional displacement sensor; and
(f) carriage control means forming part of said monitoring and control means; said carriage control means being operatively connected to said additional drive motor for controlling the displacement of said washing carriage as a function of the position of said filter plate engaging elements.

10. A plate filter press as defined in claim 9, further comprising
(g) a guide beam mounted on said washing carriage and extending transversely to said length dimension; said sled being mounted on said guide beam for said movement with respect to said carriage;
(h) an angle lever pivotally mounted on said sled and carrying said washing tube; and
(i) an abutment provided on said guide beam and cooperating with said angle lever for effecting a swinging motion of said angle lever upon motion of said sled beyond a predetermined location of said guide beam for displacing said washing tube from an operative position into an inoperative position.

* * * * *